Nov. 20, 1962 G. W. COURTRIGHT 3,065,015
WEEDER FORK
Filed Nov. 22, 1960
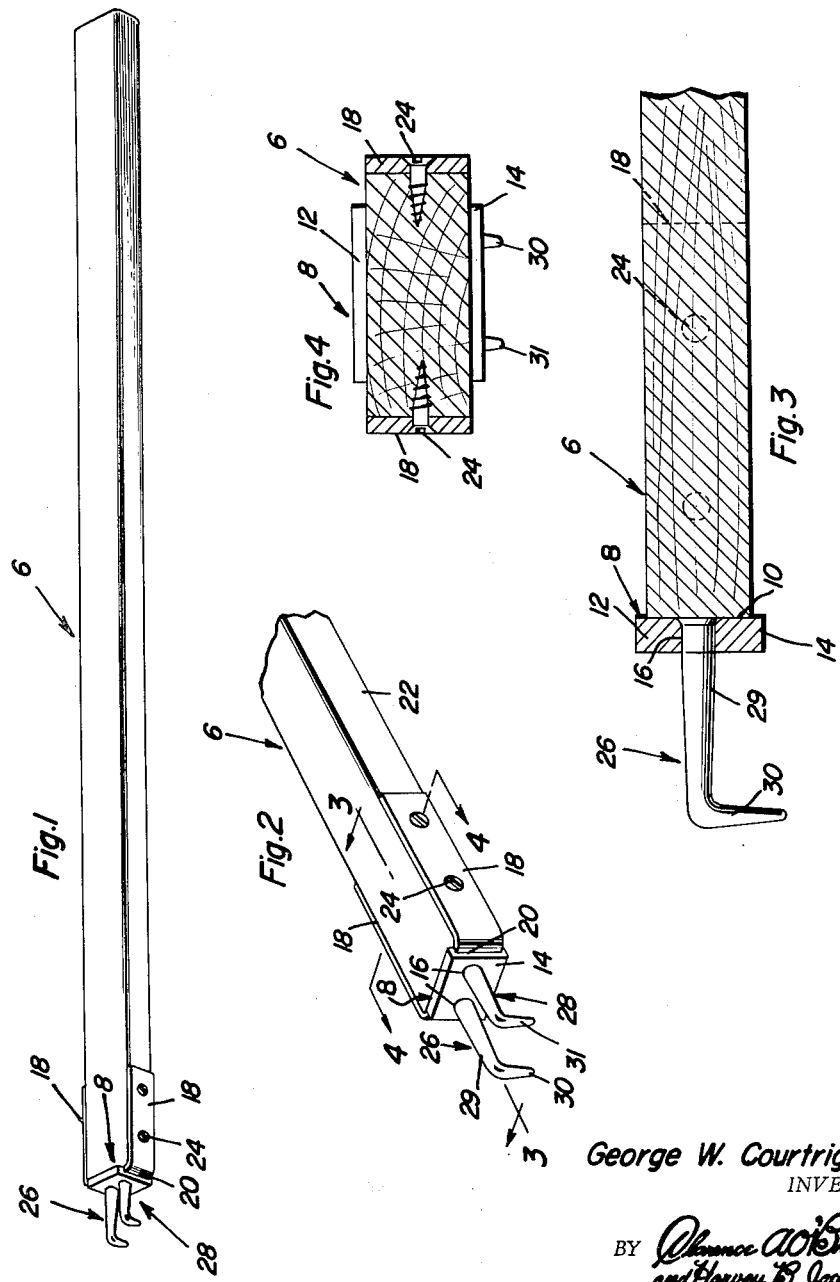
George W. Courtright
INVENTOR.

United States Patent Office

3,065,015
Patented Nov. 20, 1962

3,065,015
WEEDER FORK
George W. Courtright, Red Bluff, Calif., assignor of forty-five percent to Harvey A. Clark, Red Bluff, Calif.
Filed Nov. 22, 1960, Ser. No. 71,068
2 Claims. (Cl. 294—19)

This invention relates to an improved hand operated tool or implement, more particularly, a manually actuatable long-handled weeder fork-type tool which may be effectively and reliably used as a weeding fork or weeding hook and for other purposes to be hereinafter described.

Lawn and garden care requires an expenditure of much valuable time and labor and, while many and varying tools and implements are available to facilitate meeting the difficulties encountered, the task of bending, stooping and twisting, in order to use such tools, is a problem indeed. A satisfactory solution of the problem appears to reside in having a tool of proper construction to work with. To this end, the instant invention has to do with an improved tool which is aptly suited and designed to better cope with the difficulties met, particularly when weeding either a lawn or a garden, as the case may be.

The instant invention features a suitably constructed long handle which obviates stooping and bending while weeding. Being able to stand and walk freely without having to repeatedly stoop down and get up while weeding is ever so important as a time and labor saver, but this non-stooping is perhaps incidental to the more significant fact that the working end of the handle is implemented with simple but feasible weeding means. To this end, novel claw or fork means is provided, said means comprising hooked fingers or tines (or prongs) affixed to the working or leading end of the handle.

More specifically, the tines are L-shaped in side elevation, are preferably made from suitable spring steel and are tapered for ease of positioning and use.

One improvement resides in providing a wooden or an equivalent handle or reach member for stand-up use, said handle being non-circular, generally rectangular in cross-section so that it may be caught hold of and rotated a quarter of a turn or so in properly utilizing the fork or claw means which is mounted on the leading or forward end thereof.

Also, and as above suggested, a simple fork or claw is employed. This claw or fork is made up of a pair of closely spaced coplanar hooked fingers or tines, one longer than the other, each comprising a tapered shank and a tapering hook or bill, the shank being plugged into a hole provided therefor in a base or anchoring plate and welded or otherwise fixedly secured in place.

The restricted space between the fingers permits them to straddle the weed or the like which is to be excavated and removed and, while still associated with the fingers, dropped into a nearby receptacle or, alternatively, one which may be carried by the user. In this connection, experience has shown that the user may weed the lawn or garden with a minimum of disturbance to the soil with no noticeable injury to the lawn or garden and plants and may be utilized with expediency, once the user acquires the knack of skilfully handling the tool.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a view in perspective of a weeder fork for tool constructed in accordance with the principles of the present invention.

FIG. 2 is a fragmentary view in perspective showing the details on a slightly larger scale.

FIG. 3 is a longitudinal section on the plane of the section line 3—3 of FIG. 2, looking in the direction of the arrows.

FIG. 4 is a cross-section taken on the plane of the line 4—4 of FIG. 2.

The aforementioned handle or reach member is denoted by the numeral 6 and is of proper length that it may be satisfactorily handled and otherwise utilized without bending or stooping. The handle may be of any suitable material. In the experimental models, a wooden handle has been employed satisfactorily and, as will be noticed from the drawings, the handle is non-circular (usually rectangular) in cross-section so that it may be caught hold of and turned about its axis while being employed.

Before discussing the claw or fork means, the means for mounting the same on the forward or outer end of the handle will be taken up. To this end, the numeral 8 designates a generally rectangular base or plate. As shown in FIGS. 3 and 4 in particular, the rearward side of the plate abuts the forward end 10 of the handle. The upper and lower edge portions 12 and 14 project above and below the corresponding upper and lower surface portions of the handle. This plate is provided as best shown in FIG. 3 with a pair of side-by-side holes or sockets 16. Bendable metal straps 18 are employed to attach and mount the plate 8 on the handle. The end portions 20 of the straps are bent toward each other and properly welded or otherwise secured to the adjacent ends of the plate in the manner shown. The straps proper are arranged along the longitudinal edge portions 22 of the handle and are secured thereto by screws or equivalent fasteners 24.

Both of the tines or fingers are L-shaped in side elevation. In practice these fingers are preferably constructed of spring steel. One tine or finger, the longer one, is about one inch and a quarter long and is denoted by the numeral 26 while the companion tine or finger, the shorter one, is about one inch long and is denoted by the numeral 28. The fingers are circular in cross-section and are tapered from their inner toward their outer ends. The shanks are of corresponding cross-section and these shanks 29 are telescoped into the sockets or holes 16 and welded or otherwise secured therein as brought out in FIG. 3. The laterally bent tapered outer ends define the hooks or bill portions 30 and 31, respectively. In actual practice the shanks 29 are relatively close together and are also coplanar.

The attaching straps 18 with their turned in end portions 20 joined to the end portions of the intervening cleat or plate 8 constitute novel attaching means for the tines 26 and 28, the latter projecting beyond the cleat or plate. All of these component parts, in a collective sense, may be construed as a small but sturdly readily attachable and detachable tool head. These features are mentioned here to provide a basis for language employed in defining the invention in the following claims.

The herein disclosed tool may be aptly and satisfactorily used in effectively weeding lawns and gardens, as a "third arm and hand" when picking berries from a thorny bush, and for piercing and picking up loose paper and debris from one's lawn or elsewhere.

Providing a wooden or equivalent handle having the desired length and non-circular cross-section insures good leverage for tough-to-do jobs as, for example, eradicating buck horn weeds. Also, the handle provides the necessary reach where the weeds are hidden by obstructing foliage and plants.

When using the tool as a weeder fork the user places the tines 26 and 28 on or adjacent to the weed which is to be eradicated, the bill portions 30 and 31 being directed forwardly. He then tilts or swings the long handle so that it assumes a generally upright position with the upper or top portion at arm's length in front of himself. He next puts the tip or toe of his foot on the lower too-equipped end of the handle and proceeds to press the tines into the ground one tine on each side of the root. He grasps and twists the handle one-quarter to the right. The weed may now be pulled up from about one and a quarter inches below the surface. The extracted weed now resides in a curved position against the plate 8. By righting the handle and raising the fork tines with points or bills directed down and applying a light tap on the upper open end of a nearby trash can or container (not shown) the weed may be dropped into the same.

It may be stated that the long tine 26 does the pulling of the weed's root supported by the companion tine 28, the latter backing up, as it were, in the cavity or excavation opened up by the action of the tine 26 moving around to the right. The tine 28 simply backs up with its shank to the cavity wall and "locks" the tine to the weed root.

The fork can also be used as a weeder hook. Merely place the tines on the ground to the right of the weed to be acted on with the pointed bills 30 and 31 directed forwardly. The long tine 26 should be at the bottom. Hold the high point of the handle at waist level. Reach out and hook onto the selected weed below the crown of said weed. Hook it from the right side and extract it for disposal as above explained.

When being used for picking berries, the claw-like fingers or hooked tines 26 and 28 may be directed upwardly and hooked under and onto the limb of a cluster of berries so that the same may be pulled into convenient picking reach. To do this, it is suggested that the upper or inward end of the handle be placed, for example, under the left armpit (not shown) and slid along and held by the arm in an obvious manner whereupon both hands of the user will be available for convenient picking. When used in this manner, the claw-equipped handle functions as a mechanical or "third hand."

Considering the fact that tools and implements are employed in different ways by different users the above suggestions for use are, of course, merely suggestive and not controlling. The thing of importance is the tool and the particular construction thereof.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A foot and hand operated and controlled weeding tool comprising: an elongated rigid handle non-circular in cross-section and of appreciable cross-section that it is capable of being manipulated and controllably handled in part by toe pressure applied to a lower portion of said handle by the user's foot, said handle being capable of being rotated by the user's hands and of requisite length that it not only constitutes an extension of the user's arm and hand but can as a result of the length be handled while standing and without stooping, said handle having a distal weeding end, a two-fingered weeding claw carried by said weeding end, said claw embodying a single pair of companion closely spaced and disposed in parallel side-by-side L-shaped tines secured at their rearward ends to the forward end of the handle and projecting therebeyond in a plane parallel with the longitudinal axis of the handle and having free outer ends which are bent laterally, said tines being located one to the left and the other to the right of said longitudinal axis and progressively tapered and reduced in cross-section from their inner to their outer terminal ends, being circular in cross-section, the outer laterally directed ends being of the same length but one finger being of a length greater than the other finger, said fingers being confined to a position wholly within the surrounding marginal edges which encompass the aforementioned weeding end of said handle.

2. A manually usable tool designed and adapted for weeding comprising: an elongated handle rectangular in cross-section, a rigid plate aligned with and abutting a forward outer end of the handle, said plate being of an area corresponding generally with the area of said forward outer end and having diametrically opposite end portions thereof provided with spaced parallel strap members paralleling and embracing lengthwise edge portions of the handle adjacent said outer end and secured thereto, and complemental claw means embodying a single pair of companion fingers, said fingers having rearward ends fixedly secured to said plate within encompassing marginal limits of the plate, said fingers each being L-shaped in side elevation and including a shank having a lateral hook at its outer end, said fingers being disposed in closed spaced parallel coplanar relationship, one finger being of a length greater than the length of the other finger, said fingers being tapered lengthwise, said plate being provided with holes close together and providing sockets, and the cooperating rearward ends of said shanks being plugged and fixedly mounted in their respective sockets.

References Cited in the file of this patent

UNITED STATES PATENTS

| 218,642 | Robison | Aug. 19, 1879 |
| 266,576 | Zimmer | Oct. 24, 1882 |
| 351,932 | Mitchell | Nov. 2, 1886 |
| 423,640 | Stiles | Mar. 18, 1890 |
| 1,930,000 | Bulger | Oct. 10, 1933 |
| 2,064,448 | Rieff | Dec. 15, 1936 |
| 2,443,828 | Lamb | June 22, 1948 |
| 2,861,835 | Smith | Nov. 25, 1958 |
| 2,882,085 | Abbott | Apr. 14, 1959 |

FOREIGN PATENTS

| 384,452 | Great Britain | of 1932 |